United States Patent
Harpur et al.

(10) Patent No.: US 10,956,872 B2
(45) Date of Patent: Mar. 23, 2021

(54) MESSAGE HANDLING

(75) Inventors: Liam Harpur, Skerries (IE); Mark Kelly, Skerries (IE); John Rice, Waterford (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1585 days.

(21) Appl. No.: 13/270,422

(22) Filed: Oct. 11, 2011

(65) Prior Publication Data
US 2012/0089688 A1 Apr. 12, 2012

(30) Foreign Application Priority Data
Oct. 12, 2010 (EP) .................... 10187302

(51) Int. Cl.
*G06Q 10/10* (2012.01)
*H04L 29/08* (2006.01)

(52) U.S. Cl.
CPC ........... *G06Q 10/107* (2013.01); *H04L 67/22* (2013.01)

(58) Field of Classification Search
CPC ....... G06Q 10/107; G06Q 10/10; H04L 67/22

USPC .................................................. 709/206, 224
See application file for complete search history.

(56) References Cited

U.S. PATENT DOCUMENTS

| | | | |
|---|---|---|---|
| 7,680,892 B2 | 3/2010 | Knox et al. | |
| 2001/0003202 A1* | 6/2001 | Mache et al. | 713/153 |
| 2006/0080614 A1* | 4/2006 | Lentz | 715/753 |
| 2006/0085515 A1* | 4/2006 | Kurtz et al. | 709/207 |
| 2006/0167992 A1* | 7/2006 | Cheung et al. | 709/204 |
| 2007/0143414 A1* | 6/2007 | Daigle | 709/206 |
| 2008/0089496 A1* | 4/2008 | Chu et al. | 379/100.08 |
| 2008/0298386 A1* | 12/2008 | Fiatal | G06Q 30/02 370/449 |

* cited by examiner

*Primary Examiner* — Joon H Hwang
*Assistant Examiner* — Sherman Lin
(74) *Attorney, Agent, or Firm* — Cuenot, Forsythe & Kim, LLC

(57) ABSTRACT

A method of handling a message comprises receiving a message comprising content such as keywords, receiving a selection of one or more recipients for the message, identifying that at least one recipient is unfamiliar with a portion of the message, and notifying the composer of the message of the portion.

12 Claims, 5 Drawing Sheets

MESSAGE HANDLING

CROSS-REFERENCE TO RELATED APPLICATIONS

This application claims the benefit of European Application Number 10187302.4 filed on Oct. 12, 2010, which is fully incorporated herein by reference.

BACKGROUND

One or more embodiments disclosed within this specification relate to message handling.

Electronic communication technologies such as email and instant messaging allow users to communicate quickly and efficiently over long distances. Asynchronous communication methods such as email allow a sender to compose a message and send that message to one or more recipients. The recipients will then each access that message when it is convenient for them to do so. Synchronous communication methods such as instant messaging allow multiple users to communicate at the same time. When a message is created in an instant messaging client and then sent, it is immediately available to the other users who are participating in the instant messaging session. These communication techniques also allow messages to distribute a wide range of additional electronic media such as text files, pictures and so on.

One problem with such communication techniques, especially when large numbers of recipients are specified for a message, is that the sender of the message can easily over-estimate the knowledge of the recipients. In the modern business world much communication, particularly electronic communication, includes jargon, acronyms and company-specific designations such as project names, which can be difficult to understand for any recipient who is not familiar with the term being used. The sender of a message has no way of knowing whether all of the recipients of a message understand all of the content of the message, or that all of the recipients are at the same level of knowledge with respect to the subject matter being discussed in the message. This can lead to confusion on the part of one or more of the recipients, who are often reluctant to reveal that they do not understand a term being used in a message, either through reasons of embarrassment or through a desire not to break the flow of the communication stream.

It is therefore an object of the invention to improve upon the known art.

BRIEF SUMMARY

The embodiments of the invention relate to a method of, and system for, handling a message. In one embodiment, the invention provides a system to update a sender of a message, such as an email, when a recipient does not understand the content of the message.

According to a first aspect of the present invention, there is provided a method of handling a message comprising receiving a message, receiving a selection of one or more recipients for the message, identifying that at least one recipient is unfamiliar with a portion of the message, and notifying the composer of the message of the portion of the message.

According to a second aspect of the present invention, there is provided a system for handling a message comprising a user interface arranged to receive a message and to receive a selection of one or more recipients for the message, and a processor arranged to identify that at least one recipient is unfamiliar with a portion of the message, and to notify the composer of the message of the portion of the message.

According to a third aspect of the present invention, there is provided a computer program product comprising a computer readable storage medium having program instructions readable by a computer embodied therewith for handling a message. The program instructions comprise program instructions configured to receive a message, program instructions configured to receive a selection of one or more recipients for the message, program instructions configured to identify that at least one recipient is unfamiliar with a portion of the message, and program instructions configured to notify the composer of the message of the portion of the message.

Owing to the embodiments of the invention, it is possible to provide a system that will automatically notify the composer of a message if it is decided that one or more recipients of the message do not necessarily understand the entire message. The notification to the composer of the message can occur before the message is sent or can occur after the message has been received at the respective recipients. This will depend upon the configuration of the system and the locations of the users. For example, if the communication technology embodying the invention is internal to a single organisation, then it will be possible to configure the system such that the composer of the message is notified prior to sending the message. If the proposed recipients are located in multiple different organisations, then the notification may have to be configured so that it is sent after receipt by the specific named recipients.

In the context of the invention, the term message is considered to include everything that is transmitted from the composer to the recipients, thereby including the entire content of message including the text portion of the message, the subject title (if any) of the message and the attachments (if any) included within the message. The message could be an email message or a message sent via an instant messaging client, for example, but could also be a voicemail message or broadcast message, for example in a video conferencing system where multiple users are connected together. The reference to a portion of the message means either a single keyword or phrase within the message that can be recognised by the system.

Applications such as online search engines or instant messaging software can allow users to hover over acronyms and other content and additional information can be provided as a pop-up with the meaning of these words or phrases. Generally, this is only point-in-time information and does not take into account the prior knowledge of the sender and receiver before the sending of the message. The sender of a message often assumes the skill level of the recipient, but often the recipients will start searching keywords and phrases in the messages. In current systems it is not possible to ascertain if the recipient is skilled enough and additionally does not subsequently notify the sender of problems the message may have caused.

Currently when holding a multiple person conversation by email or instant messaging individuals can compose a message assuming that everything they say is understood by the recipient. While the recipient tries to keep up, they can end up being confused by the content if they do not understand what the sender is saying. If the sender takes two minutes to explain, on a one-to-one basis, certain technical content, then over time this can save embarrassment and a lot of time for the recipient. The improved system works alongside messaging technologies so that when the recipient hovers over acronyms or technical words the sender is advised that the recipient did not know what this meant and therefore the sender can discuss this in more detail with the recipient and save on further misunderstandings.

The improved system addresses and improves upon the known problems with existing systems. For example, the improved system can be configured to send a message back to the sender to warn the sender that the recipient has been searching keywords or phrases in the message and even more so has never received a mail/message with a specific keyword/phrase before. This will save time and embarrassment for both parties and in the end will lead to more successful communication amongst colleagues.

Preferably, the step of identifying that at least one recipient is unfamiliar with a portion of the message comprises identifying an explicit recipient action in respect of the portion. For example, the step of identifying the explicit recipient action in respect of the portion comprises identifying that the recipient performs a search for the portion. The system can identify that a recipient is searching for a keyword in an email directly after a user has received and accessed the content of the email, for example. This can be used as indicative that the recipient is not fully versant with the particular term used in the message, and this can be communicated back to the author of the message, so that the original composer of the message can be made aware that at least one recipient is having trouble with the content of the message. It is not specified how the composer of the message has to react to the information received concerning the recipient's unfamiliarity with a keyword/phrase in the message. The sender of the message could contact the recipient directly or could adapt their future correspondence with the recipient, for example.

Advantageously, the step of identifying that at least one recipient is unfamiliar with a portion of the message comprises identifying that the recipient has not previously received the portion. For example, the step of identifying that the recipient has not previously received the portion comprises accessing a record of keywords and/or phrases for the recipient. The information passed to the composer of the message does not have to be generated in response to an explicit action by a recipient of the message. For example, there may be in existence electronic resources that can be checked to see if a recipient is familiar with a keyword or phrase. Such a resource may take the form of a record of keywords and phrases that are commonly found in messages received by the recipient, which is generated in the background as a user interfaces with their email client. The absence of a keyword contained in a message from such a record may be taken to indicate that the intended recipient is unfamiliar with the keyword. Such a record may be accessed before the message has even been sent, or may be accessed locally once the message has been received by the recipient.

BRIEF DESCRIPTION OF THE SEVERAL VIEWS OF THE DRAWINGS

Embodiments of the present invention will now be described, by way of example only, with reference to the accompanying drawings, in which.

DETAILED DESCRIPTION

Figure 1:
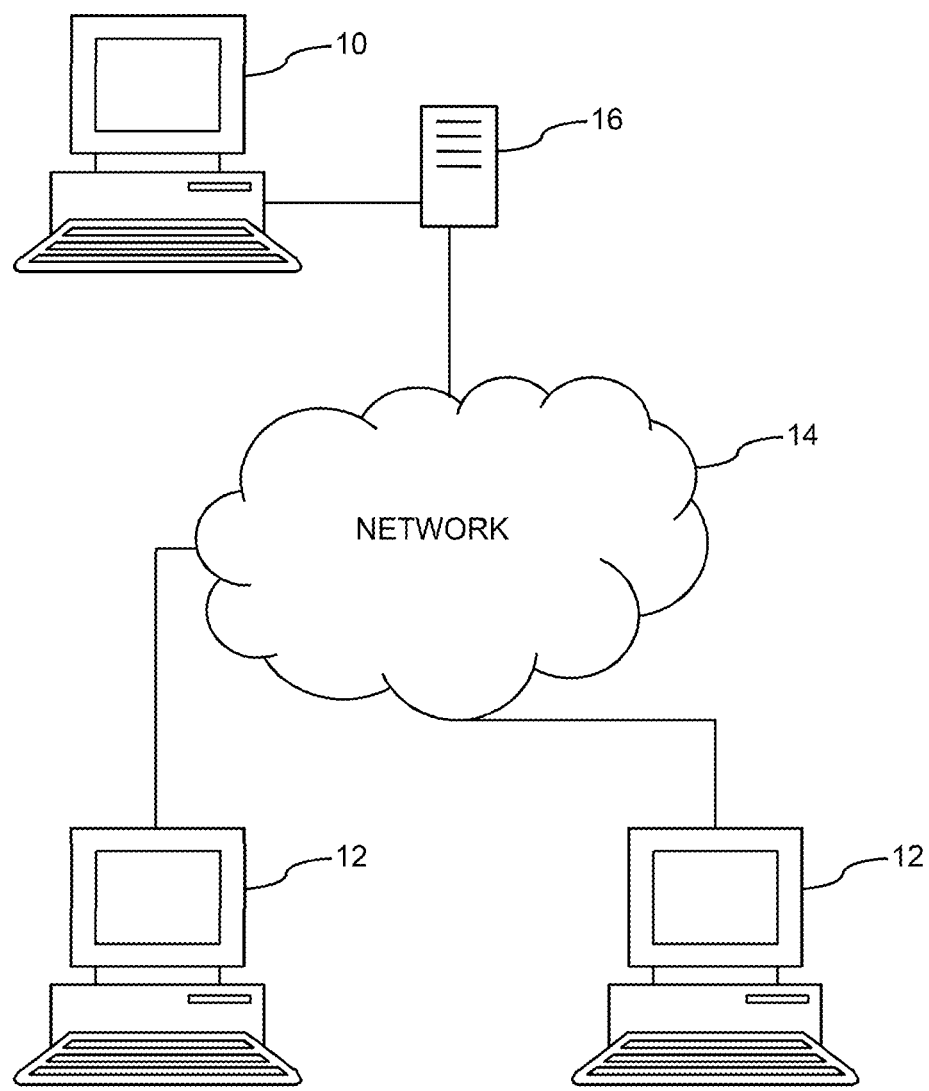
FIG. 1 is a schematic diagram of a communication system.

A communication system is shown in FIG. 1, which comprises a sender 10 and two recipients 12 connected by a network 14. The sender 10 and recipients 12 are standard desktop computers that are taking part in an instant messaging session, which is being run by a remote server (not shown) also connected to the network 14. The computers 10 and 12 include a user interface and a processor. A message 16 is being transmitted from the sender 10 to the recipients 12. The user of the computer 10 will type text into their local instant messaging client, via the user interface, and then perform an action (such as pressing the return key) to send that message 16 to all of the other participants in the instant messaging session.

Note that the designation of the computer 10 as a sender and the computers 12 as recipients, within the instant messaging session, is a purely logical designation based upon which computer is currently transmitting the message 16. In the continuing instant messaging session, all of the computers 10 and 12 will act as both senders and recipients, in the logical sense, at different times. The individual users of the computers 10 and 12 will compose messages 16 as the instant messaging session continues and these messages 16 will be transmitted to the other users, so that each user will have the same consistent instant message thread of conversation between the users.

The content of the message 16 can be more than just plain text. For example, the message 16 may include a reference to another document or location, for example in the form of an Internet address or file location. The message 16 may also include additional electronic media such as picture files or computer files such as pdf files. In this way, the sender 10 can provide information to the recipients 12, as the instant messaging session continues. The recipients 12, when participating in the session as senders, can likewise send anything in the message 16, as long as what is being sent is supported by the instant messaging system being run by the remote server.

Figure 2:
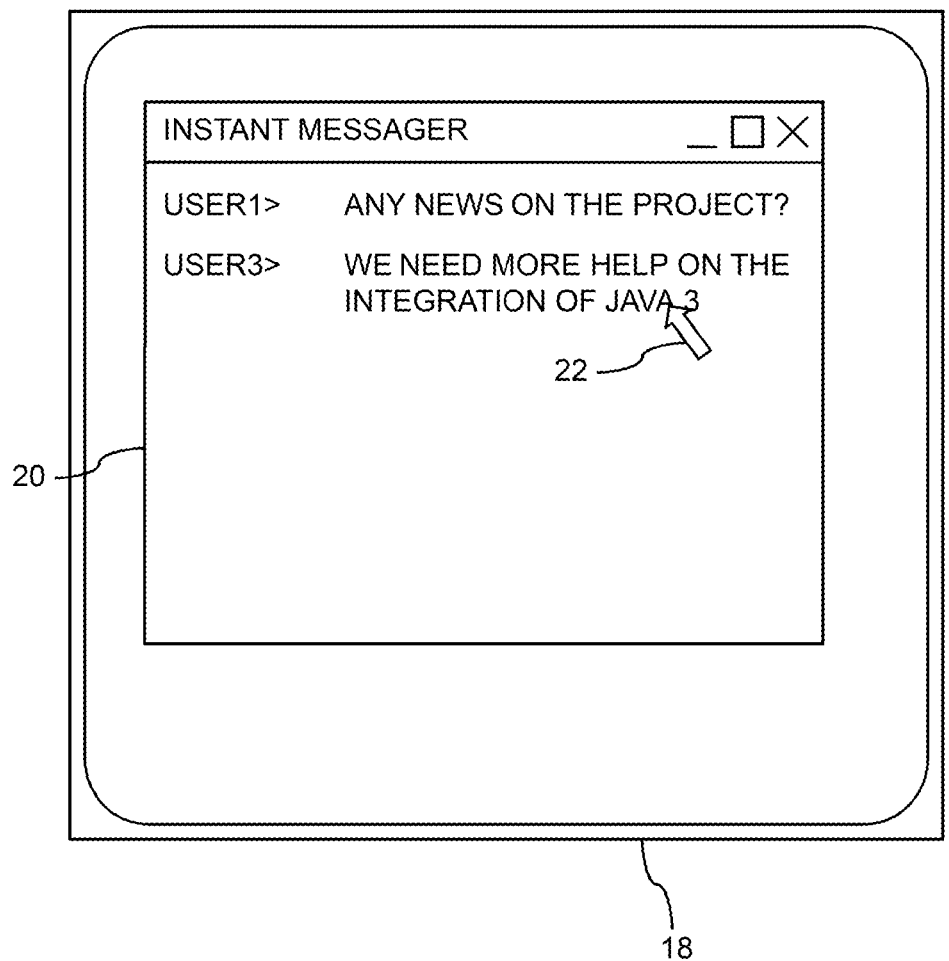
FIG. 2 is a schematic diagram of a display device.

A display device 18 of a user is shown in FIG. 2. This user is assumed to be using one of the computers 12 shown in FIG. 1. The display device 18 of the computer 12 shows a window 20 for an instant messaging client. As individual users compose messages and press send on their local device then these messages will appear in the instant messaging client of each user who is participating in the instant messaging session. In this case, User1 has sent a first message "Any news on the project?" and User3 has replied "We need more help on the integration of Java 3". User2 has received both messages but not replied to either.

The window 20 shown in FIG. 2 can be considered to be that of the User2, who has used the cursor 22 to hover over the term "Java" appearing in the message sent by User3. The user is hovering the cursor 22 over the term to access further information about that specific portion of the message. The instant messaging client has the functionality to deliver additional information automatically in such situations, for example by linking directly to an external dictionary or encyclopaedia such as Wikipedia, for example. The action of the User2 of hovering the cursor 22 over a keyword in this way will bring up a pop-up window with the further information.

In general terms, the action by the User2 is indicative that the user is not familiar with the expression "Java" used in the message from User3. This information is fed back to the composer of the message, in this case User3. A notification will be generated by that user's instant messaging client informing them that the specific User2 has been identified as a recipient of the message and that the identified portion of the message is not familiar to them. User3 can now take any action that they see fit, for example by generating a new message adding more detail to their previous message, or by contacting User2 directly via another method, perhaps via email.

Figure 3:
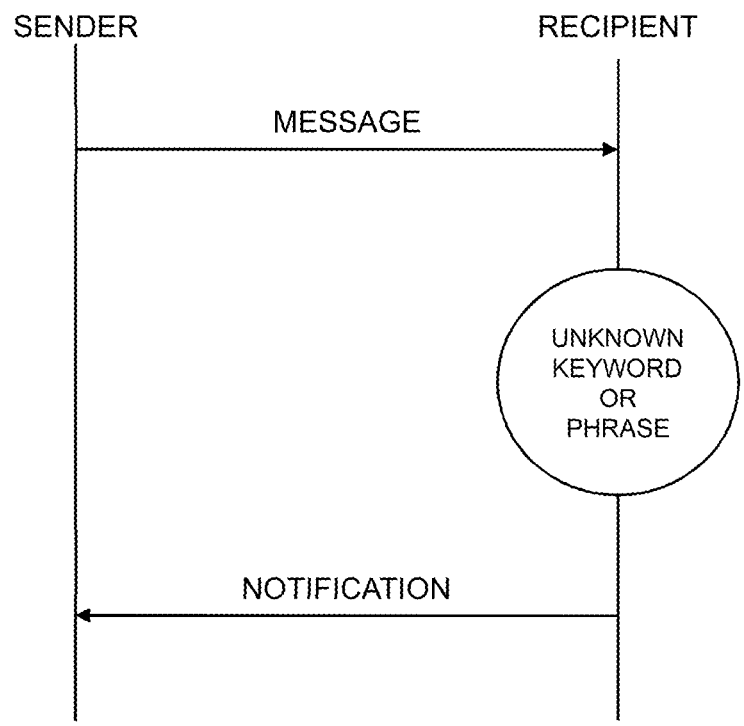
FIG. 3 is a schematic diagram of message traffic in the system.

The system that operates this feedback mechanism may operate the following steps, as illustrated in FIG. 3. A first User1 sends a message to User2, the recipient. User2 reads the message. User2 may be unfamiliar with any of the terms used in the message. For example, User1 gets a notification that the term "Java" may not be understood by User2 because they are not skilled in that area, or that term was not used by them in their chat histories or in their mail file. Similarly, any unknown words/acronyms that the recipient hovers over to get an update also result in action being taken. The notification is sent to User1.

User1 receives the notification to say the recipient does not understand a particular keyword or phrase and/or has never received this word in a mail or message and had to look up what the specific term or phrase meant. Then User1 can then optionally explain acronyms/keywords to User2 and this will save potential embarrassment and time wasted through continuing with something that User2 does not understand. The sender does not have to respond to the notification in any fixed way, they can deal with this information as they see fit. They may respond immediately, or may contact the recipient at a later date, to go over the topic that is not understood by the recipient.

If the message is sent to multiple recipients, then more than one notification may be sent back to the original sender. For example, two of the recipients might be having difficulty understanding a specific topic mentioned in the message, and the sender will receive either two separate notifications, or a combined notification about both unfamiliar portions of the message, depending upon the configuration of the feedback system. Two recipients could be confused about different things in the same message, in which case the original sender will again be informed of the two recipients with the problem and to which keywords/phrases the individual users are having problems. Again this could be via a single combined notification or via multiple notifications.

The system can also work without there needing to be an explicit action on the part of a recipient of the message. For example, the sender sends a message to one or more recipients. A recipient reads the message, and this triggers an agent to search through mails and messages for previous use of keywords/phrase within the message. The sender receives a notification to say that the recipient does not know a specific keyword/phrase and or has never received this word in a mail or message. The sender can then explain acronyms/keywords to the recipient and this will save on embarrassment and time wasted on going on about something the recipient does not understand.

Figure 4:
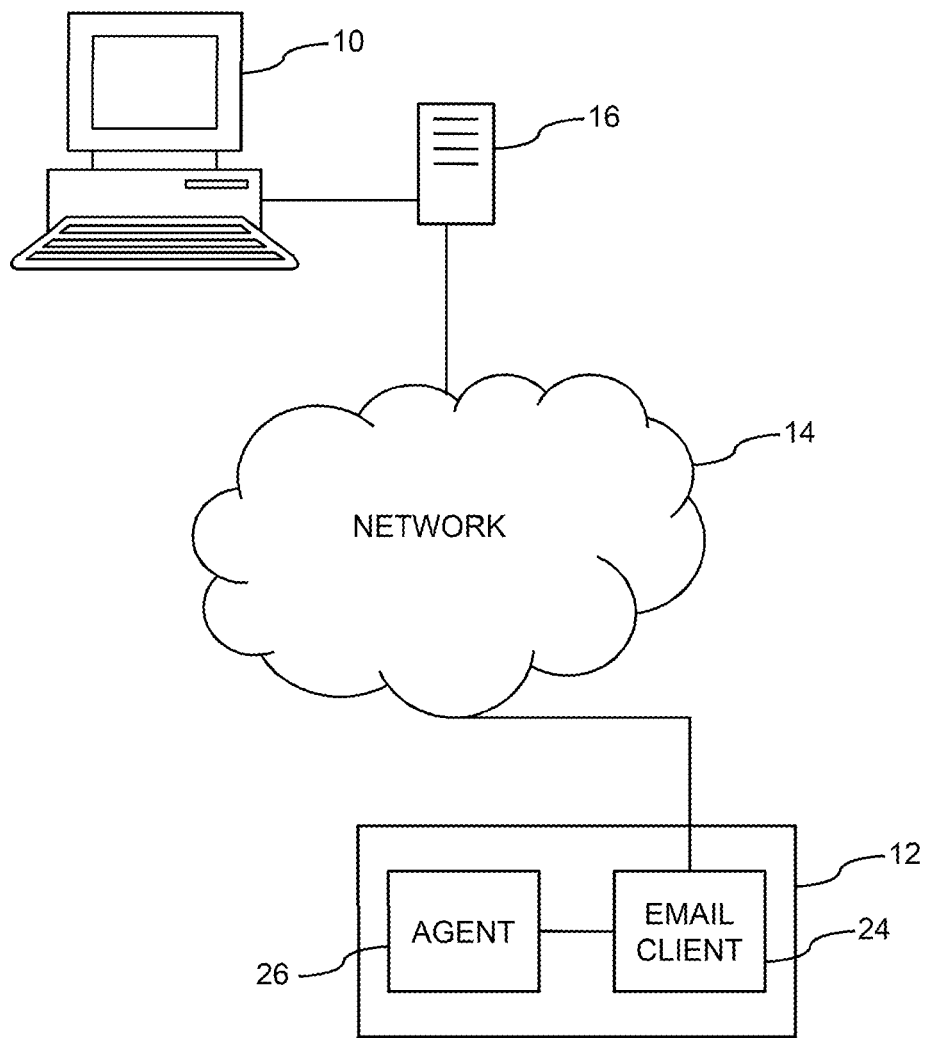
FIG. 4 is a further schematic diagram of the system.

FIG. 4 illustrates the system with respect to the receiver side of the communication, where an email client 24 connects through the network 14 to an email server (not shown). The message 16 is recalled from the email server and is then available for viewing by the user of the computer 12. The user accesses the message 16 through the email client 24. In the background, the agent 26 also scans the content of the message 16. The agent 26 can access a record of keywords/phrases for the recipient, which will enable the agent to determine if there is any portion of the message 16 with which the recipient is unfamiliar.

The background check can also be used in synchronous communication technologies such as instant messaging. This is especially helpful in a multi-person chat when there may be ten people discussing a subject that one user does not clearly understand. A message 16 that is composed and sent with the instant messaging software will be checked by a local agent on each receiving computer 12. The agent will compare the content of the message 16 with a record of known keywords and phrases and if any new keywords or phrases are detected then a notification is sent back to the sender of the message 16. Multiple different notifications may be sent back to the sender as a result of the background check.

Figure 5:
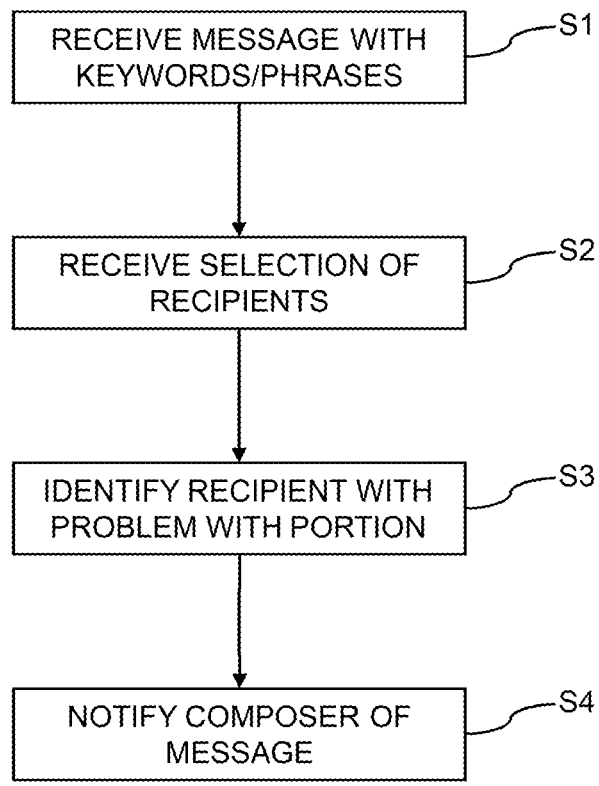
FIG. 5 is a flowchart of a method of operating the system.

The method of handling the message is summarised in the flowchart of FIG. 5. These method steps are carried out by one or more computer programs being executed on a processor. The method comprises the steps of, firstly step S1, receiving a message, secondly step S2, receiving a selection of one or more recipients for the message, thirdly step S3, identifying that at least one recipient is unfamiliar with a portion of the message, and finally step S4, notifying the composer of the message of the unfamiliar portion of the message. Steps S3 and S4 can take place after the message has been sent and received by the recipient or can take place after the message has been composed and before the message has been sent.

The step S3 of identifying that at least one recipient is unfamiliar with a portion of the message can comprise identifying an explicit recipient action in respect of the portion such as identifying that the recipient performs a search for the portion. As discussed above, the realisation that the recipient does not understand some of the content of the message may be based upon a specific action that the recipient makes in response to receiving and reading the message. This could be highlighting words or phrases in the message, hovering over certain keywords to access database entries or accessing a totally different application to perform a search on a keyword.

Alternatively, the step S3 of identifying that at least one recipient is unfamiliar with a portion of the message can comprise identifying that the recipient has not previously received the portion, for example by accessing a record of keywords and/or phrases for the recipient. As discussed above, with respect to FIG. 4, for example, an agent on the recipient's computer could make a check against a record to see whether any of the terms used in the message are unknown to the recipient and feed this information back to the creator of the message. This could take place in the background without the knowledge of the recipient of the message.

The method described above is carried out at either a single location, such as the processor of one of the computers 10 and 12, or the method steps are distributed between different locations within the system. This will depend on whether the keyword checking is performed at the sender's computer 10 or at the recipient's computer 12. In most implementations, the receipt of the message 16 and the details of the recipients for the message 16 will take place at the user interface of the sender's computer 10 and the keyword checking and the notification generation is performed at the processor of the recipient's computer 12.

In general, when the composer of a message is informed about a specific keyword or phrase, which is not understood by a recipient of the message, the composer will also be informed about the identity of that recipient. However, this is not essential, nor is it always desirable. Summarised feedback can be aggregated across users, particularly if the message has a large number of recipients, as sometimes happens with company-wide or site-wide emails. For example, the composer might be informed that 30% of recipients would probably not understand a message because certain keywords or phrases within the message have been identified as being unfamiliar to those recipients. In this example, the composer would not be provided with the details of the specific recipients.

The invention claimed is:

1. A computer-implemented method, comprising:
   receiving an electronic message, sent by a sending client device in an instant messaging session, to a plurality of recipients;
   identifying, for each of the plurality of recipients, whether the recipient is unfamiliar with a portion of the electronic message;
   calculating a total number of the plurality of recipients to which the electronic message is directed;
   calculating, for the portion of the electronic message, a total number of the plurality of recipients who were determined as being unfamiliar with the portion of the electronic message; and
   forwarding, to the sending client device, a notification indicative of a total number of the plurality of recipients to which the electronic message is directed and the total number of the plurality of recipients who were determined as being unfamiliar with the portion of the electronic message, wherein,
   the notification causes an instant messaging client with the client device to display a percentage,
   the percentage is determined by dividing the total number of the plurality of recipients who were determined as being unfamiliar with the portion of the electronic message by the total number of the plurality of recipients to which the electronic message is directed,
   the notification does not indicate, to the client device, an identity of any of the plurality of recipients who were determined as being unfamiliar with the portion of the electronic message,
   a particular recipient from the plurality of recipients is identified as being unfamiliar with the portion of the electronic message based upon an agent within a computer device being accessed by the particular recipient, and,
   the agent is configured to:
      identify a keyword being within the portion of the electronic message, and
      identify the keyword being used in a communication application separate from the communication application in which the electronic message is received by the computer device being accessed by the particular recipient.

2. The method of claim 1, wherein
   the agent is configured to:
      search through records stored within the computer device being accessed by the particular recipient for prior use of a keyword within the electronic message.

3. The method of claim 1, wherein
   the agent is configured to:
      detect information regarding the keyword is being gathered by the computer device being accessed by the particular recipient.

4. The method of claim 3, wherein
   the information regarding the keyword is gathered by the user linking to an external resource regarding the keyword.

5. A computer hardware system, comprising:
   a hardware processor configured to initiate the following executable operations:
      receiving an electronic message, sent by a sending client device in an instant messaging session, to a plurality of recipients;
      identifying, for each of the plurality of recipients, whether the recipient is unfamiliar with a portion of the electronic message;
      calculating a total number of the plurality of recipients to which the electronic message is directed;
      calculating, for the portion of the electronic message, a total number of the plurality of recipients who were determined as being unfamiliar with the portion of the electronic message; and
      forwarding, to the sending client device, a notification indicative of a total number of the plurality of recipients to which the electronic message is directed and the total number of the plurality of recipients who were determined as being unfamiliar with the portion of the electronic message, wherein,
   the notification causes an instant messaging client with the client device to display a percentage,
   the percentage is determined by dividing the total number of the plurality of recipients who were determined as being unfamiliar with the portion of the electronic message by the total number of the plurality of recipients to which the electronic message is directed,
   the notification does not indicate, to the client device, an identity of any of the plurality of recipients who were determined as being unfamiliar with the portion of the electronic message,
   a particular recipient from the plurality of recipients is identified as being unfamiliar with the portion of the electronic message based upon an agent within a computer device being accessed by the particular recipient, and,
   the agent is configured to:
      identify a keyword being within the portion of the electronic message, and
      identify the keyword being used in a communication application separate from the communication application in which the electronic message is received by the computer device being accessed by the particular recipient.

6. The system of claim 5, wherein
   the agent is configured to:
      search through records stored within the computer device being accessed by the particular recipient for prior use of a keyword within the electronic message.

7. The system of claim 5, wherein
   the agent is configured to:
      detect information regarding the keyword is being gathered by the computer device being accessed by the particular recipient.

8. The system of claim 7, wherein
   the information regarding the keyword is gathered by the user linking to an external resource regarding the keyword.

9. A computer program product, comprising:

a hardware storage device having stored therein program instructions, which when executed by a computer hardware system, causes the computer hardware system to perform:

receiving an electronic message, sent by a sending client device in an instant messaging session, to a plurality of recipients;

identifying, for each of the plurality of recipients, whether the recipient is unfamiliar with a portion of the electronic message;

calculating a total number of the plurality of recipients to which the electronic message is directed;

calculating, for the portion of the electronic message, a total number of the plurality of recipients who were determined as being unfamiliar with the portion of the electronic message; and forwarding, to the sending client device, a notification indicative of a total number of the plurality of recipients to which the electronic message is directed and the total number of the plurality of recipients who were determined as being unfamiliar with the portion of the electronic message, wherein, the notification causes an instant messaging client with the client device to display a percentage, the percentage is determined by dividing the total number of the plurality of recipients who were determined as being unfamiliar with the portion of the electronic message by the total number of the plurality of recipients to which the electronic message is directed, the notification does not indicate, to the client device, an identity of any of the plurality of recipients who were determined as being unfamiliar with the portion of the electronic message, a particular recipient from the plurality of recipients is identified as being unfamiliar with the portion of the electronic message based upon an agent within a computer device being accessed by the particular recipient, and, the agent is configured to:

identify a keyword being within the portion of the electronic message, and identify the keyword being used in a communication application separate from the communication application in which the electronic message is received by the computer device being accessed by the particular recipient.

10. The computer program product of claim 9, wherein the agent is configured to:

search through records stored within the computer device being accessed by the particular recipient for prior use of a keyword within the electronic message.

11. The computer program product of claim 9, wherein the agent is configured to:

detect information regarding the keyword is being gathered by the computer device being accessed by the particular recipient.

12. The computer program product of claim 11, wherein the information regarding the keyword is gathered by the user linking to an external resource regarding the keyword.

\* \* \* \* \*